(12) United States Patent
Oxley

(10) Patent No.: US 9,650,468 B2
(45) Date of Patent: May 16, 2017

(54) ENCAPSULATION OF ACTIVE AGENTS FOR ON-DEMAND RELEASE

(71) Applicant: Southwest Research Institute, San Antonio, TX (US)

(72) Inventor: James D. Oxley, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 184 days.

(21) Appl. No.: 13/913,168

(22) Filed: Jun. 7, 2013

(65) Prior Publication Data

US 2013/0270726 A1    Oct. 17, 2013

Related U.S. Application Data

(62) Division of application No. 12/246,279, filed on Oct. 6, 2008, now abandoned.

(51) Int. Cl.
| | |
|---|---|
| *A61K 6/00* | (2006.01) |
| *C08G 59/14* | (2006.01) |
| *B01J 13/16* | (2006.01) |

(52) U.S. Cl.
CPC .......... *C08G 59/1477* (2013.01); *B01J 13/16* (2013.01)

(58) Field of Classification Search
CPC .... C08G 18/58; C09D 7/1291; C09D 163/00; C09D 5/08
USPC ........ 428/402–402.24, 403, 404, 407, 321.1, 428/474.4; 427/331, 389.9, 212, 427/213–213.36, 483, 256; 264/534, 5, 264/41, 4–4.7; 424/400, 408, 450, 451, 424/455, 93.7, 184.1, 497, 489, 501, 490, 424/491, 492, 493, 494, 495
See application file for complete search history.

(56) References Cited

U.S. PATENT DOCUMENTS

2006/0252852 A1\* 11/2006 Braun et al. .................. 523/200
2007/0029653 A1\* 2/2007 Lehman et al. .............. 257/678
2008/0299391 A1\* 12/2008 White et al. ............. 428/402.21

\* cited by examiner

*Primary Examiner* — James J Seidleck
*Assistant Examiner* — S. Camilla Pourbohloul
(74) *Attorney, Agent, or Firm* — Grossman, Tucker et al.

(57) ABSTRACT

The present disclosure relates to a method of forming microcapsules. The method may include combining an active agent in a first solvent $S_1$ and forming a dispersed phase of the active agent in the first solvent, wherein the dispersed phase of active agent has a surface. A reactant may be added to the first solvent, wherein the reactant reacts with the surface of the active agent dispersed phase and encapsulates the active agent wherein at least a portion of the active agent remains unreacted.

20 Claims, 1 Drawing Sheet

ENCAPSULATION OF ACTIVE AGENTS FOR ON-DEMAND RELEASE

CROSS REFERENCE TO RELATED APPLICATIONS

The present application is a divisional of co-pending U.S. application Ser. No. 12/246,279, filed Oct. 6, 2008, the entire content of which is incorporated herein by reference.

STATEMENT REGARDING FEDERALLY SPONSORED RESEARCH OR DEVELOPMENT

This invention was made with United States Government support under Contract No. FA9550-06-C-0079 awarded by the United States Air Force. The Government has certain rights in this invention.

FIELD OF THE INVENTION

The present disclosure relates to the microencapsulation of active agents, such as amines, via a reverse phase interfacial polymerization process.

BACKGROUND

Microcapsules may be considered particles, such as droplets of an agent surrounded by a shell or coating, which may form a wall around the agent. In a particular example, microencapsulation may be utilized in self healing composites or coating, wherein the microcapsules may include an active material that may react upon exposure to other compounds in the coating. The active ingredients in the microcapsules may be exposed as micro-cracks and/or cracks develop and/or propagate in the material, rupturing the microcapsules. Reactive agents may also be provided in microcapsules or dispersed in the composite or coating, which interact with the exposed active agents to bond the surfaces of the micro-cracks together.

SUMMARY OF THE INVENTION

An aspect of the present disclosure relates to a method of forming microcapsules. The method may include combining an active agent in a first solvent $S_1$ and forming a dispersed phase of the active agent in the first solvent, wherein the dispersed phase of active agent may have a surface. In addition, a reactant may be added to the first solvent, wherein the reactant may react with the surface of the active agent dispersed phase and the active agent may be encapsulated, wherein 50% by weight or more of the active agent remains unreacted.

Another aspect of the present disclosure relates to a method of forming microcapsules. The method may include combining an active agent comprising a compound having amine functionality in a first solvent $S_1$ and forming a dispersed phase of the active agent in the first solvent, wherein the dispersed phase of active agent may have a surface. The method may also include adding a reactant having isocyanate functionality to the first solvent, wherein the reactant may react with the surface of the active agent dispersed phase and form polyurea encapsulating the active agent wherein 50% by weight or more of the active agent remains unreacted.

A further aspect of the present disclosure relates to a method of reducing the propagation of stress. The method may include supplying microcapsules containing an encapsulated amine compound, the microcapsules having a size of 1 micron to 200 microns including a shell portion that has a thickness of less than or equal to 20 microns and distributing the microcapsules in the presence of an epoxy prepolymer in a selected structure, wherein upon introduction of stress into the structure, the microcapsules release the amine compound which then reacts with the epoxy prepolymer. The epoxy prepolymer may itself be present as microcapsules having a size of 1 micron to 200 microns.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1B:
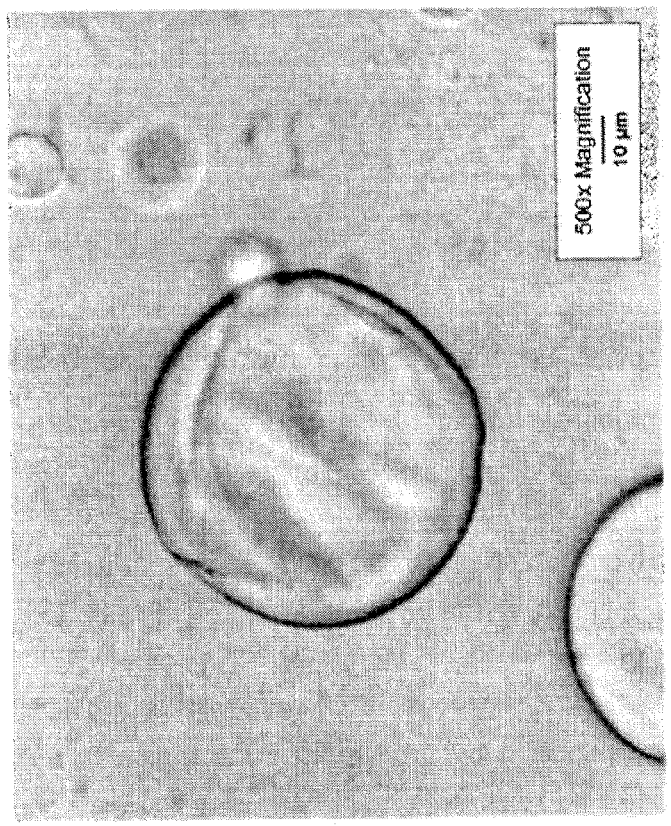
FIGS. 1a and 1b are micrographs of exemplary microcapsules including an aqueous solution of 60% DETA in a polyurea shell at 50× and 500× magnification respectively.

The present disclosure relates to a process of forming microcapsules including an active agent therein which may be formed by reverse phase interfacial polymerization. The active agent may be one of the agents utilized for forming the microcapsule outer shell. The microcapsules may then be utilized in a manner that selectively releases the reactive core material which may then react with a corresponding substance and undergo a polymerization reaction. The polymer so formed may provide a coating, adhesive, sealant, etc. For example, the polymer may adhere and/or stabilize areas including micro-cracks or fractures. The active agent within the core of the microcapsule may include a constituent of a one part or two part adhesives, such as an active agent amine compound for preparing an epoxy polymer, a polyurethane, polysilicones, or phenolics and/or urea formaldehyde type polymers.

The reverse phase interfacial polymerization suitable for use herein may include the addition of an active agent into a first solvent $S_1$, and in particular an immiscible solvent, i.e., a solvent in which the active agent is immiscible or does not readily combine. The level of miscibility herein may therefore be understood to be that level of immiscibility such that the active agent forms a discrete phase, which discrete phase may specifically assume the form of a droplet. As may be appreciated, the size of the droplet so formed may depend upon the level of agitation. As may be appreciated, when a solid shell is then formed about the droplet, a microcapsule may be developed.

The active agent may therefore be dispersed as an immiscible phase in the first solvent by emulsification, wherein the active agent may form droplets having a largest linear dimension such as an overall diameter in the range of 1 μm to 200 μm, including all values and increments therein, such as 1.0 μm to 100 μm. A reactant may then be added to the first solvent containing the dispersed active agent. The reactant may itself be provided in a second solvent $S_2$ that is miscible with the first solvent containing the dispersed active agent droplets. Accordingly, the reactant may then diffuse and come in contact with the surface of the droplets and react and form a polymeric shell about the droplets, with microcapsule formation and encapsulation of the active agent.

Accordingly, it may be appreciated that in general, one may utilize an active agent that is immiscible in a first solvent ($S_1$). The active agent may then be dispersed as a discontinuous phase in the first solvent. One may then provide a reactant (a compound that will react with the active agent) in a second solvent ($S_2$), where $S_2$ is miscible or partially miscible with $S_1$. For example, the first solvent $S_1$ and second solvent $S_2$ may be selected such that they have a Hildebrand solubility parameter values ($\delta$) that are within +/−2.0 units of one another, as measured in $(MPa)^{1/2}$. Those skilled in the art may appreciate that the Hildebrand solubility parameter represents the square root of the cohesive energy density and provides a numerical estimate of the degree of interaction of selected materials.

Upon introduction of the second solvent $S_2$ containing the reactant with the first solvent $S_1$ containing the dispersed active agent as a discontinuous phase, the reactant may only react with the surface of the active agent with ensuing formation of a shell and microcapsules. The size of the microcapsules may be, as noted, controlled by the level of agitation. Accordingly, the reactant may be selected such that it does not diffuse into the active agent droplet and solidify and/or swell the droplet, and is selected such that it is generally limited to reacting only with within the surface region of the active agent to encapsulate and preserve and provide the active agent for later on demand chemical reaction purposes. That is, at least a portion of the active agent is unreacted and available for an ensuing chemical reaction, as more fully described below, as applied to, e.g., the control of crack propagation. For example, for a given amount of active agent dispersed as a discontinuous phase, 50% by weight or more (up to 100% by weight) of the active agent is made available for ensuing chemical reactions, including all values and increments therein in 1.0% increments.

Furthermore, the reactant is such that for any of the droplet sizes noted herein, the reactant may only diffuse within 10% of the droplet dimension. For example, for a droplet having a largest linear size (e.g. diameter) of 100 microns, the reactant is such that it will not diffuse and react more than 10 microns into the droplet and therefore provide a shell portion that has a thickness of less than or equal to 10 microns. By way of additional example, for a droplet having a largest linear dimension of 200 microns, the reactant is such that it will not diffuse and react more than 20 microns into the droplet, thereby providing a shell portion that has a thickness of less than or equal to 20 microns.

Surfactants may be employed in either the first solvent or second solvent, to regulate droplet size diameter and droplet size distribution, or stabilize microcapsule suspensions after formation. One surfactant that may be employed is sorbitan monooleate, which is generally available as a mixture of partial esters of sorbitol and its mono- and dianhydrides with oleic acid. It is also contemplated herein that one may employ those surfactants that have relatively low HLB values (i.e. hydrophilic-lipophile balance). HLB value is reference to an indication of the relative solubility of the surfactant. That is, the lower the HLB value the more lipophilic or oil soluble and the higher the HLB value the more water soluble or hydrophilic surfactant is present. HLB values may generally fall within the range of 0.5 to 19.5. Therefore, HLB values, such as less than or equal to 10.0, may be employed herein.

It may also be appreciated that one may desirable seek a balance between the amount of any given surfactant that may be employed to provide relatively smaller droplets while at the same time ensuring shell formation for the formed microcapsules. Furthermore, the surfactants may be added once encapsulation is achieved, to stabilize the suspension of microcapsules and to otherwise reduce or prevent microcapsule agglomeration.

The active agent herein may include any agent that may be dispersed as a discontinuous phase in a given solvent. The active agent may be sufficiently reactive to first form the shell of the microcapsule with a given reactant. The active agent may also be one that has sufficient reactive functionality such that, when released from the shell, is itself capable of triggering a polymerization with a corresponding compound to form a relative high molecular weight resin (e.g. a number average molecular weight or Mn value of greater than 10,000).

For example, the active agent, which may now be encapsulated in the manner noted above, may be one that has a reactive functionality of 2 or more. In other words, the active agent may be a monomer suitable for use in a step growth type polymerization, where a monomer having a functionality of 2 is capable of forming a linear polymer chain. Accordingly, reference to functionality is reference to the number of covalent bonds that may be formed by the active agent with a corresponding reactive compound. Use of active agents with a functionality of greater than 2 may therefore define a monomer that is capable of branching and/or crosslinking. The step growth polymerization that may occur may include step growth polycondensation type reactions as well as step growth polyaddition type reactions.

The active agents suitable for encapsulation and use herein may include, for example, organic base compounds. For example, the organic base compounds may include amines, including primary monofunctional amines (R—$NH_2$) where R is an alkyl, substituted alkyl, aromatic and/or substituted aromatic type group. The active agent may also include secondary amines ($R_1$—NH—$R_2$), such as diethylenetriamine (DETA) or triethylenetetramine. Both $R_1$ and $R_2$ may be an alkyl, substituted alkyl, aromatic and/or substituted aromatic type group In addition, the active agents for encapsulation may include mixtures of, e.g., primary amines with secondary amines, wherein each amine may be present in an amount of 0.1-99.9% by weight. For example, one may include a mixture of 50% by weight of a primary amine and 50% by weight of a secondary amine, and encapsulate such mixture which when released in the presence of a suitable compound, may undergo a polymerization type reaction.

In addition, the active agents may also include polyols, such as diols (HO—R—OH) or triols $R(OH)_3$, wherein, once again, R may be an alkyl, substituted alkyl, aromatic or substituted aromatic type group. Furthermore, the active agent herein may be a thiol type compound, such as a monofunctional thiol compounds (SH—R) or a dithiol type compounds, such as HS—R—SH, wherein once again, R may be an alkyl, substituted alkyl, aromatic or substituted aromatic type group.

The active agent, prior to incorporation in a given immiscible solvent, may be first incorporated into a diluent, such as water. Other diluents, such as poly(ethylene glycol), poly(ethylene imine)s and other amine or hydroxyl functionalized agents may be utilized as well, alone or in combination, with water. The diluent may be present in the range of 1% to 90% of the total weight of the combined active agent and diluent mixture, including all values and increments therein, such as in the range of 20% to 60% by weight of the mixture.

As noted above, the first solvent herein $S_1$ includes a solvent in which the active agent is immiscible such that the active agent may form a discrete phase, such as a droplet.

The size of the droplets so formed may be controlled by selection of the solvent, along with the rate of agitation, to fall in the range of 1.0 to 100 microns, including all values and increments therein, in 1.0 micron increments. For example, the droplets may have a size of 10 to 90 microns, or 20 to 80 microns, etc. Or, the droplets may have a size of, e.g., 20 microns to 50 microns, or 30 to 50 microns, etc.

In addition, the solvent ($S_1$) for the active agent may advantageously be selected to provide a relatively high viscosity, for example, the viscosity may be in the range of greater than or equal to about 10 centistokes (cSt), at 40° C. For example, the viscosity may be in the range of 10-200 cSt at 40° C., including all values and increments therein in 1 cSt increments.

In such a manner, the viscosity of the solvent $S_1$ may assist in maintaining the droplets of active agent relatively dispersed (i.e. the viscosity of the solvent thereby reducing the relative amount of diffusion and the relative ability of the active agent to otherwise aggregate). The solvent $S_1$ may be hydrocarbon based, including hydrocarbon based alkane solvents, having in the range of 5 to 50 carbons, including all values and increments therein. In one example, the first solvent may include mineral oil, such as parrafinic oil, napthenic oil or aromatic oil, having a viscosity of greater than or equal to about 35 cSt at 40° C. One example of a suitable first solvent is what is known as heavy mineral oil available from Fisher Scientific, which reportedly has a viscosity of 34.5 cSt at 40° C., and a specific gravity of 0.845 to 0.905 at 25° C.

The solvent $S_1$ may also include organic lipids, including waxes, fats or other oils, as well a silicones, including silicone oils or grease. The second solvent $S_2$ may include, for example, an aliphatic or aromatic hydrocarbon, having in the range of 3 to 20 carbons, including all values and increments therein, such as cyclohexane or hexane. The second solvent may be present in the range of 10% to 200% by volume of the first solvent.

Reactants may include any chemical compound that may react or polymerize with the active agent and form a shell around the droplets of active agent, sufficient to contain the active agent for a later chemical reaction. The reactant may include a compound containing isocyanate functionality (OCN—R—NCO), which when combined with an active agent such as a diamine compound may form a polyurea shell (—HN—R—NH—CO—NH—R—NH—CO—), or when combined with an active agent such as a polyol may form polyurethane (—O—R—O—CO—NH—R—NH—CO—), wherein once again, R may take the form of an alkyl group, a substituted alkyl group, an aromatic group and/or a substituted aromatic group. For example, the isocyanate based compounds may include 2,4-toluene-diisocyanate (TDI), methylene diphenyl diisocyanate (MDI), or hexamethylene diisocyanate (HMDI). The isocyanate based compounds may also include polymeric methylene diisocyanates (PMDI) wherein it may be appreciated that the average functionality of isocyanate groups per reactant molecular may be greater than 2.0, and may, e.g., assume a value of greater than 2.0 up to a value of 5.0 (i.e. PMDI with an isocyanate functionality of 2-5). Other reactants may be utilized as well, depending on the active agent that is selected and provided in droplet form. The reactant may specifically be added in the range of 10% to 50% by weight of the total active agent present as dispersed droplets, which may then provide sufficient shell formation around the active agent droplet.

Accordingly, in one example, capsules may be formed by mixing an amine, such as diethylenetriamine with water, wherein the amine may be present in the range of 40% to 80% by the total volume, including all values and increments therein. The amine-water solution may then be added to an immiscible solvent such as mineral oil, wherein the amine may be present in the range of 1 to 10% of the total volume, including all values and increments therein. The amine/water solution may be emulsified in the mineral oil, forming discrete droplets or domains of the amine/water solution in the mineral oil.

A diisocyanate, such as 2,4-toluene-diisocyante, may then be added to the mineral oil, wherein the reactant may be added in the range of 10% to 30% by weight of the amine. The reactant may be combined with a second aromatic hydrocarbon based solvent including between 3 to 10 carbons, such as cyclohexane, wherein the isocyanate is present in the solvent in the range of 10 to 20% by volume of the solvent. The isocyanate may be mixed with the mineral oil and may react with the amine, forming polyurea shells surrounding a core of diethylenetriamine and water.

After a given period of time, such as a few minutes to a few hours, including all values and increments therein, a surfactant, such as Polysorbate 80, in a second aliphatic hydrocarbon based solvent including between 3 and 10 carbons, such as hexane, may be added to the mineral oil, which may remove excess reactant from the shells. The surfactant may be present in the range of 0.1% to 10% by volume of the second solvent and/or present in the range of 20 to 40% by weight of the isocyanate. The capsules may then be removed from the solution and washed in a surfactant/solvent mixture a few more times.

The capsules may then be added to a structure including additional active agents, such as an epoxy precursor, such as the diglycidyl ether of bisphenol A, having the general structure:

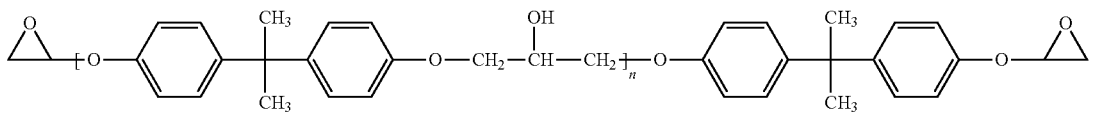

where n may have a value of 0-1000. In addition, in the above formula, it may be appreciate that other dihydroxy compounds may be used to react with epichlorohydrin to form the epoxy prepolymer. Such dihydroxy compounds may therefore include, e.g. dihydroxy aromatic compounds, e.g. bisphenol, and/or dihydroxy compounds sourced from aliphatic dihydroxy compounds, such as hexane diol.

More generally, the epoxy precursor herein may be understood to include any prepolymer, sourced from epichlorohydrin and a diol compound (e.g. bisphenol A), that is capable of curing and crosslinking in the presence of an amine compound, such as a diamine. As stress is introduced into the structure (e.g. the formation of a crack or discontinuity in a material) the capsules may rupture and the active agents, e.g. a diamine may be released and react with the epoxy prepolymer, forming a crosslinked polymer structure via a step growth addition type reaction, which cross-linked polymer structure may then stabilize the composite structure. For example, the crosslinked polymer structure may provide a tensile strength of at least 12,500 psi and higher, e.g. tensile strength values of 12,500 psi to 50,000 psi. The cross-linked polymer structures so formed may have a tensile modulus of greater than 400,00 psi, e.g., 500,000 psi to $4\times10^6$ psi. Furthermore, it may be appreciated that the epoxy prepolymer may itself be present in microcapsule form, such as in a microcapsule that has a size (largest linear dimension, such as diameter) of 1 micron to 200 microns.

Examples

An aqueous solution of 60% diethylenetriamine (DETA) was microencapsulated via interfacial polymerization as follows. 50 g of the 60% DETA was added to 500 mL of mineral oil at room temperature. The DETA was emulsified in the solution by an overhead stirrer at 1500 rpm for 1 min and then the stirring speed was then reduced to 750 rpm. 10 g of 2,4-toluene diisocyante (TDI) was added to 50 mL of cyclohexane. The TDI-cyclohexane mixture was then added to the DETA-mineral oil mixture.

After 15 minutes passed, a solution of 3 grams of Span 80 in 500 mL of hexanes was added to the DETA-mineral oil mixture. The diluted mixture was centrifuged at 500 rpm for 1 minute and the supernatant was decanted. The capsules were washed and centrifuged two additional times with a solution of 2 grams of Span 80 in 500 mL of hexanes.

Figure 1A:
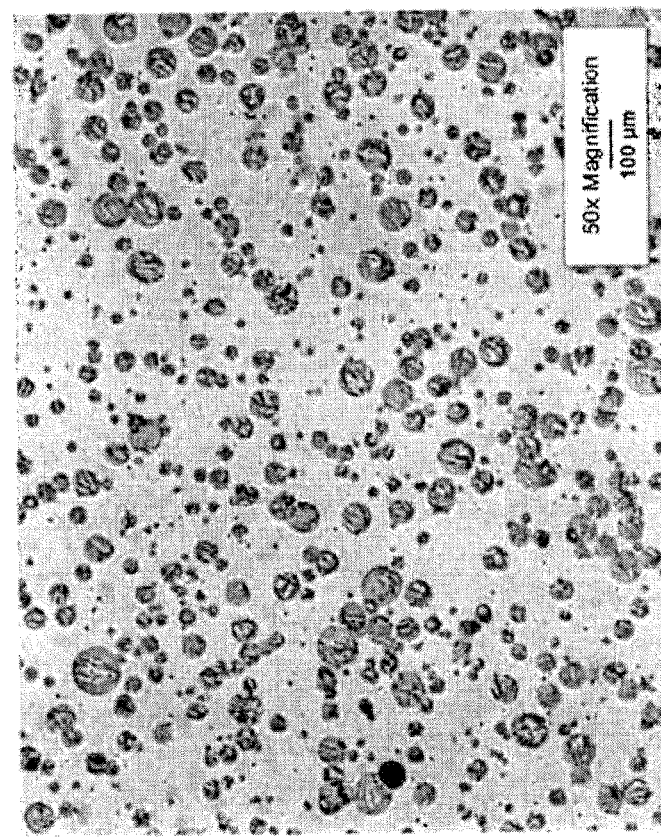

The capsules were then dispersed in a solution of hexanes and Span 80 for storage and transportation. Optical micrographs of the resulting microcapsules are illustrated in FIGS. 1a and 1b.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of reducing the propagation of stress, comprising:
    supplying microcapsules having a total volume and containing an encapsulated mixture of reactant amine compounds comprising at least a primary amine compound and a secondary amine compound wherein said mixture of amine compounds are present in the range of 40% to 80% of said microcapsule total volume, said microcapsules having a size of 1 micron to 200 microns including a shell portion, wherein said shell comprises a polyurea shell of the structure:

(—NH—R—NH—CO—NH—R—NH—CO—)

wherein R is an alkyl group, substituted alkyl group, aromatic group or substituted aromatic group and said polyurea shell has a thickness of less than or equal to 20 microns;
    distributing said microcapsules in the presence of an epoxy prepolymer in a selected structure wherein said epoxy prepolymer has the following formula:

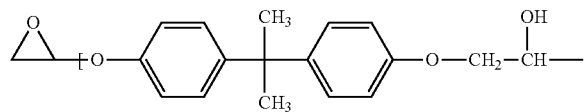

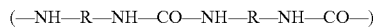
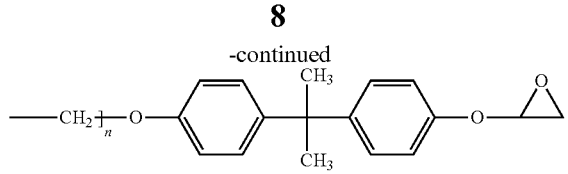

where n may have a value of 0-1000;
    wherein upon introduction of stress into said structure, said microcapsules release said mixture of reactant amine compounds, such that at least said primary amine compound and secondary amine compound react with said epoxy prepolymer to form a crosslinked epoxy polymer having a tensile strength of at least 12,500 psi and a tensile modulus of 400,000 psi to $4\times10^6$ psi.

2. The method of claim 1 wherein said stress comprises crack propagation.

3. The method of claim 1 wherein said primary amine is present at 50% by weight and said secondary amine is present at 50% by weight.

4. The method of claim 1 wherein said secondary amine comprises diethylenetriamine.

5. The method of claim 1 wherein said secondary amine comprises triethylenetetramine.

6. The method of claim 1 wherein said epoxy prepolymer is present as microcapsules having a size of 1 micron to 200 microns.

7. The method of claim 1, wherein the method further comprises, prior to supplying said microcapsules, forming said microcapsule with a method comprising:
    combining an active agent in a first solvent $S_1$ to form a dispersed phase of the active agent in said first solvent, said dispersed phase of active agent having a surface; and
    combining a reactant with a second solvent $S_2$; and
    adding said reactant in said second solvent to said first solvent, wherein said reactant reacts with said surface of said dispersed phase of active agent; and
    encapsulating the active agent;
    wherein:
    50% by weight or more of said active agent remains unreacted.

8. The method of claim 7 wherein 60% by weight or more of the active agent remain unreacted.

9. The method of claim 7 wherein said dispersed phase of said active agent comprises droplets having a largest linear dimension of 1 micron to 200 microns.

10. The method of claim 9 wherein said reactant diffuses into said surface to a depth that is less than or equal to about 10% of said largest linear dimension.

11. The method of claim 7 wherein said first solvent has a viscosity in the range of 10-200 cSt at 40° C.

12. The method of claim 7 wherein said active agent has a reactive functionality of 2 or more.

13. The method of claim 7, wherein said first solvent is mineral oil.

14. The method of claim 1, wherein the method further comprises, prior to supplying said microcapsules, forming said microcapsule with a method comprising:
    combining an active agent comprising a compound having amine functionality in a first solvent $S_1$ to form a dispersed phase of the active agent in said first solvent, said dispersed phase of active agent having a surface; and
    combining a reactant having isocyanate functionality with a second solvent $S_2$; and adding said second solvent $S_2$ containing said reactant to said first solvent $S_1$, wherein said reactant reacts with said surface of the active agent dispersed phase and forms a polyurea;
encapsulating the active agent; and
wherein 50% by weight or more of said active agent remains unreacted.

15. The method of claim 14 wherein 60% by weight or more of the active agent remain unreacted.

16. The method of claim 14 wherein said dispersed phase of said active agent comprises droplets having a largest linear dimension of 1 micron to 200 microns.

17. The method of claim 16 wherein said reactant diffuses into said surface to a depth that is less than or equal to 10% of said largest linear dimension.

18. The method of claim 14 wherein said first solvent has a viscosity in the range of 10-200 cSt at 40° C.

19. The method of claim 7 wherein said first solvent $S_1$ and said second aromatic solvent $S_2$ have first and second Hildebrand solubility parameter values, respectively, wherein said first and second Hildebrand solubility parameters are within plus or minus 2.0 units of one another as measured in $(MPa)^{1/2}$.

20. The method of claim 14 wherein said first solvent $S_1$ and said second solvent $S_2$ have first and second Hildebrand solubility parameter values, respectively, wherein said first and second Hildebrand solubility parameters are within plus or minus 2.0 units of one another as measured in $(MPa)^{1/2}$.

* * * * *